(12) United States Patent (10) Patent No.: US 7,899,924 B2
Oesterreicher et al. (45) Date of Patent: *Mar. 1, 2011

(54) FLEXIBLE STREAMING HARDWARE

(76) Inventors: Richard T. Oesterreicher, Naples, FL (US); Craig Murphy, Kirkland, WA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 10/369,306

(22) Filed: Feb. 19, 2003

(65) Prior Publication Data

US 2003/0229778 A1 Dec. 11, 2003

Related U.S. Application Data

(60) Provisional application No. 60/374,086, filed on Apr. 19, 2002, provisional application No. 60/374,090, filed on Apr. 19, 2002, provisional application No. 60/373,991, filed on Apr. 19, 2002, provisional application No. 60/374,037, filed on Apr. 19, 2002.

(51) Int. Cl.
*G06F 15/16* (2006.01)

(52) U.S. Cl. ......... 709/231; 709/232; 709/250; 713/150; 713/160; 370/229; 370/469; 370/474

(58) Field of Classification Search .................. 386/111; 713/150, 160, 191; 709/231, 250, 232, 215; 370/229

See application file for complete search history.

(56) References Cited

U.S. PATENT DOCUMENTS

| | | | |
|---|---|---|---|
| 4,731,783 A | 3/1988 | Fontanes et al. | |
| 4,800,431 A * | 1/1989 | Deering | 348/719 |
| 5,333,299 A | 7/1994 | Koval et al. | |
| 5,367,636 A | 11/1994 | Colley et al. | |
| 5,375,233 A | 12/1994 | Kimber et al. | |
| 5,430,842 A | 7/1995 | Thompson et al. | |
| 5,515,379 A | 5/1996 | Crisler et al. | |
| 5,566,174 A | 10/1996 | Sato et al. | |
| 5,638,516 A | 6/1997 | Duzett et al. | |
| 5,689,709 A | 11/1997 | Corbett et al. | |
| 5,710,908 A | 1/1998 | Man | |
| 5,715,356 A | 2/1998 | Hirayama et al. | |
| 5,719,786 A | 2/1998 | Nelson et al. | |
| 5,737,525 A | 4/1998 | Picazo, Jr. et al. | |
| 5,751,951 A | 5/1998 | Osborne et al. | |

(Continued)

FOREIGN PATENT DOCUMENTS

CN 1484898 A 3/2004

(Continued)

OTHER PUBLICATIONS

Product Review, Amphion Announces Rijndael Encryption Cores, <http://www.chipcenter.com/pld/products_600-699/prod627.htm> (visited May 10, 2002).

(Continued)

*Primary Examiner* — Nasser Moazzami
*Assistant Examiner* — Shanto M Abedin
(74) *Attorney, Agent, or Firm* — Woodcock Washburn LLP

(57) ABSTRACT

A hardware engine that streams media asset data from a media buffer to a network under instructions provided by a host PC is disclosed. The PC preferably stores control blocks that provide packet header formatting instructions in a media buffer along with the media asset data to be streamed. In a preferred embodiment, the hardware engine comprises programmable logic devices so that the engine can be upgraded. The present invention further comprises methods for designing the hardware engine, methods for upgrading the hardware engine, and methods for streaming digital media asset data.

30 Claims, 11 Drawing Sheets

U.S. PATENT DOCUMENTS

| | | | |
|---|---|---|---|
| 5,768,598 A | 6/1998 | Marisetty et al. | |
| 5,781,227 A | 7/1998 | Goode et al. | |
| 5,805,804 A | 9/1998 | Laursen et al. | |
| 5,815,516 A * | 9/1998 | Aaker et al. | 714/807 |
| 5,819,049 A | 10/1998 | Rietmann | |
| 5,848,192 A | 12/1998 | Smith et al. | |
| 5,857,109 A * | 1/1999 | Taylor | 712/37 |
| 5,892,535 A * | 4/1999 | Allen et al. | 725/36 |
| 5,915,094 A * | 6/1999 | Kouloheris et al. | 709/219 |
| 5,925,099 A * | 7/1999 | Futral et al. | 709/204 |
| 5,948,065 A | 9/1999 | Eilert et al. | |
| 5,966,162 A | 10/1999 | Goode et al. | |
| 5,995,974 A | 11/1999 | Anton et al. | |
| 5,996,015 A | 11/1999 | Day et al. | |
| 6,023,731 A | 2/2000 | Chawla | |
| 6,047,323 A | 4/2000 | Krause | |
| 6,088,360 A * | 7/2000 | Amaral et al. | 370/412 |
| 6,101,255 A * | 8/2000 | Harrison et al. | 380/52 |
| 6,108,695 A | 8/2000 | Chawla | |
| 6,112,226 A | 8/2000 | Weaver et al. | |
| 6,119,154 A | 9/2000 | Weaver et al. | |
| 6,122,670 A | 9/2000 | Bennett et al. | |
| 6,138,147 A | 10/2000 | Weaver et al. | |
| 6,148,414 A | 11/2000 | Brown et al. | |
| 6,157,051 A | 12/2000 | Allsup et al. | |
| 6,157,955 A | 12/2000 | Narad et al. | |
| 6,166,730 A | 12/2000 | Goode et al. | |
| 6,182,206 B1 | 1/2001 | Baxter | |
| 6,192,027 B1 | 2/2001 | El-Batal | |
| 6,208,335 B1 | 3/2001 | Gordon et al. | |
| 6,222,838 B1 | 4/2001 | Sparks et al. | |
| 6,233,607 B1 | 5/2001 | Taylor et al. | |
| 6,240,553 B1 | 5/2001 | Son et al. | |
| 6,260,155 B1 | 7/2001 | Dellacona | |
| 6,289,376 B1 | 9/2001 | Taylor et al. | |
| 6,314,572 B1 | 11/2001 | LaRocca et al. | |
| 6,314,573 B1 | 11/2001 | Gordon et al. | |
| 6,345,302 B1 | 2/2002 | Bennett et al. | |
| 6,496,692 B1 | 12/2002 | Shanahan | |
| 6,498,897 B1 * | 12/2002 | Nelson et al. | 386/125 |
| 6,502,194 B1 | 12/2002 | Berman et al. | |
| 6,535,518 B1 | 3/2003 | Hu et al. | |
| 6,535,557 B1 | 3/2003 | Saito et al. | |
| 6,594,775 B1 | 7/2003 | Fair | |
| 6,618,363 B1 | 9/2003 | Bahl | |
| 6,640,145 B2 * | 10/2003 | Hoffberg et al. | 700/83 |
| 6,651,103 B1 * | 11/2003 | Markowitz et al. | 709/231 |
| 6,687,757 B1 * | 2/2004 | Ben-Ze'ev et al. | 709/250 |
| 6,732,104 B1 | 5/2004 | Weber | |
| 6,732,243 B2 | 5/2004 | Busser et al. | |
| 6,820,144 B2 * | 11/2004 | Smirnov et al. | 710/52 |
| 6,842,785 B1 | 1/2005 | Norcott et al. | |
| 6,876,653 B2 * | 4/2005 | Ambe et al. | 370/389 |
| 6,879,266 B1 | 4/2005 | Dye et al. | |
| 6,879,598 B2 * | 4/2005 | Zancan et al. | 370/463 |
| 6,944,152 B1 | 9/2005 | Heil | |
| 6,944,585 B1 | 9/2005 | Pawson | |
| 6,947,430 B2 * | 9/2005 | Bilic et al. | 370/395.71 |
| 6,956,853 B1 * | 10/2005 | Connery et al. | 370/392 |
| 6,963,561 B1 | 11/2005 | Lahat | |
| 6,971,043 B2 | 11/2005 | McLoughlin et al. | |
| 6,981,167 B2 | 12/2005 | Johnson et al. | |
| 6,996,618 B2 | 2/2006 | Apostolopoulos et al. | |
| 7,035,278 B2 | 4/2006 | Bertram et al. | |
| 7,035,295 B2 | 4/2006 | Belleguie et al. | |
| 7,042,899 B1 * | 5/2006 | Vaida et al. | 370/463 |
| 7,043,663 B1 | 5/2006 | Pittelkow et al. | |
| 7,152,027 B2 | 12/2006 | Andrade et al. | |
| 7,174,086 B2 | 2/2007 | Lin et al. | |
| 7,200,670 B1 * | 4/2007 | Hearn et al. | 709/232 |
| 7,228,358 B1 | 6/2007 | McManus | |
| 7,240,113 B1 | 7/2007 | Barry et al. | |
| 7,260,576 B2 | 8/2007 | Pasupathy et al. | |
| 7,266,609 B2 | 9/2007 | Bill et al. | |
| 7,359,955 B2 | 4/2008 | Menon et al. | |
| 7,460,531 B2 * | 12/2008 | Gupta et al. | 370/389 |
| 2001/0004767 A1 | 6/2001 | Gordon et al. | |
| 2001/0019336 A1 | 9/2001 | Gordon et al. | |
| 2001/0037443 A1 | 11/2001 | Liu | |
| 2002/0000831 A1 * | 1/2002 | Smith | 326/39 |
| 2002/0007417 A1 | 1/2002 | Taylor et al. | |
| 2002/0067745 A1 * | 6/2002 | Coupe et al. | 370/535 |
| 2002/0105905 A1 * | 8/2002 | Boyle et al. | 370/229 |
| 2002/0107971 A1 | 8/2002 | Bailey et al. | |
| 2002/0107989 A1 | 8/2002 | Johnson et al. | |
| 2002/0150123 A1 * | 10/2002 | Ro | 370/465 |
| 2002/0174227 A1 | 11/2002 | Hartsell et al. | |
| 2003/0079018 A1 | 4/2003 | Lolayekar et al. | |
| 2003/0095783 A1 | 5/2003 | Binder et al. | |
| 2003/0097481 A1 | 5/2003 | Richter | |
| 2003/0108030 A1 * | 6/2003 | Gao | 370/351 |
| 2003/0135577 A1 | 7/2003 | Weber et al. | |
| 2003/0221197 A1 | 11/2003 | Fries et al. | |
| 2003/0223735 A1 * | 12/2003 | Boyle | 386/111 |
| 2003/0227943 A1 * | 12/2003 | Hallman et al. | 370/503 |
| 2004/0006635 A1 * | 1/2004 | Oesterreicher et al. | 709/231 |
| 2004/0006636 A1 * | 1/2004 | Oesterreicher et al. | 709/231 |
| 2004/0034712 A1 * | 2/2004 | Rajwan et al. | 709/231 |
| 2004/0133570 A1 | 7/2004 | Soltis | |
| 2006/0146780 A1 | 7/2006 | Paves | |

FOREIGN PATENT DOCUMENTS

| | | |
|---|---|---|
| EP | 0473102 | 3/1992 |
| EP | 0781002 | 10/2003 |
| TW | 406227 | 9/2000 |
| TW | 421972 | 2/2001 |
| TW | 435028 | 5/2001 |
| TW | 447201 | 7/2001 |
| TW | 452690 | 9/2001 |
| TW | 452701 | 9/2001 |
| TW | 453080 | 9/2001 |
| TW | 454132 | 9/2001 |
| TW | 457444 | 10/2001 |
| TW | 460781 | 10/2001 |
| TW | 465209 | 11/2001 |
| TW | 465211 | 11/2001 |
| TW | 475111 | 2/2002 |
| WO | WO 00/04719 | 1/2000 |
| WO | WO 00/33567 | 6/2000 |
| WO | WO 00/42776 | 7/2000 |
| WO | WO 00/45590 | 8/2000 |
| WO | WO 00/59202 | 10/2000 |
| WO | WO 00/59203 | 10/2000 |
| WO | WO 00/59220 | 10/2000 |
| WO | WO 00/59228 | 10/2000 |
| WO | WO 01/31605 | 5/2001 |
| WO | WO 01/43434 | 6/2001 |
| WO | WO 01/43438 | 6/2001 |
| WO | WO 01/52537 | 7/2001 |
| WO | WO 01/55860 | 8/2001 |
| WO | WO 01/55877 | 8/2001 |
| WO | WO 01/56290 | 8/2001 |
| WO | WO 02/45308 | 6/2002 |
| WO | 03089944 | 10/2003 |
| WO | WO 2003/090100 | 10/2003 |
| WO | WO 2003/090101 | 10/2003 |
| WO | WO 2004/034707 | 4/2004 |
| WO | WO 2006/012496 | 2/2006 |

OTHER PUBLICATIONS

Implementing Multiprotocol Label Switching with Altera PLDs, Jan 2001.

DVB Master PCI Bus DVB/ASI Receive or Send Interface, <http://www.linsys.ca/products/hardware/dvb.htm> (visited May 14, 2002).

FPGA-based MPEG TMultiple-Channel Transport Stream Generator, <http://www.csupomona.edu/~ece/eceweb/program/srproject.html (visited May 14, 2002).

Digital Program Insertion White Paper, nCube, Inc.

MCS4,MPEG2 Stream Controller PCI Card, <http://www.norpak.ca/TES8.htm> (visited May 14, 2002).

Silicon Server White Paper, Blue Arc, Inc. (2002).

Ulmer et al., Active SANs: Hardware Support for Integrating Computation and Communication.

RFC 2326: "Real Time Streaming Protocol (RTSP)." IETF, Apr. 1998, pp. 1-92.

IP Fragmentation: Questions & Answers, Oct. 28, 1999, pp. 1-4.
Microsoft Computer Dictionary, 1999, Microsoft Press, 4th Edition, p. 124.
"A Bit-Parallel Search Algorithm for Allocating Free Space," *Modeling, Analysis and Simulation of Computer and Telecommunications Systems, Ninth International Symposium*, Aug. 15-18, 2001, 302-310.
"The Cluster File System: Integration of High Performance Communication and I/O in Clusters," *IEEE Computer Society, Cluster Computing and the Grid 2nd IEEE/ACM International Symposium*, Berlin, Germany, May 21, 2002, 173-182.
"A Distributed Hierarchical Storage Manager for a Video-on-Demand System," *Storage and Retrieval for Image and Video Databases (SPIE)*, Feb. 1994, 1-13.
"Vnodes: An Architecture for Multiple File System Types in Sun UNIX," *USENIX Association: Summer Conference Proceedings*, 1986, 1-10.
"Evolving the Vnode Interface," *UNENIX Summer Conference Proceedings*, 1990, 107-117.
"HAMFS File System," *Reliable Distributed Systems, Proceedings of the 18th IEEE Symposium an Lausanne*, Switzerland, Los Alamitos, California, Oct. 19-22, 1999, 190-201.
A High-Throughput Digital Media Server for Video-on-Demand Service, May 14, 2002 Retrieved online at http://www.csupomona.edu/~ece/eceweb/program/srproject.html.
FPGA-based MPEG TMultiple-Channel Transport Stream Generator, May 14, 2002 Retrieved online at http://www.csupomona.edu/~ece/eceweb/program/srproject.html.
Altera Corporation, Application Note 132, "Implementing Multiprotocol Label Switching with Altera PLDs," Jan. 2001, ver. 1.0, pp. 1-12.
"Judge upholds jury decision in nCUBE-SeaChange patent spat," *CED Broadband Direct News*, Apr. 13, 2004, retrieved online at: http://www.cedmagazine.com/cedailydirect/2004/0404/cedaily040413.htm 1 page.
"Thirdspace investment insulates Concurrent from VOD patent war," from *CED Broadband Direct*, Jun. 10, 2002, retrieved online at: http://1www.broadbandweek.com/news/020610/020610_content_third.htm, 1 page.
Brochure for RAM-SAN™ RamSan-320, Jul. 1, 2003.
"Agere unveils 3G baseband-processing scheme," *Electronic Engineering Times*, Feb. 16, 2004, p. 37.
Taiwan Patent Application No. 092109078, Search Report dated Apr. 2, 2009.
United States Patent and Trademark Office: Non-Final Office Action dated Apr. 21, 2005, U.S. Appl. No. 10/369,305.
United States Patent and Trademark Office: Final Office Action dated Jan. 12, 2006, U.S. Appl. No. 10/369,305.
United States Patent and Trademark Office: Non-Final Office Action dated Jun. 28, 2006, U.S. Appl. No. 10/369,305.
United States Patent and Trademark Office: Final Office Action dated Jan. 18, 2007, U.S. Appl. No. 10/369,305.
United States Patent and Trademark Office: Non-Final Office Action dated Aug. 9, 2007, U.S. Appl. No. 10/369,305.
United States Patent and Trademark Office: Non-Final Office Action dated Feb. 11, 2008, U.S. Appl. No. 10/369,305.
United States Patent and Trademark Office: Final Office Action dated Aug. 1, 2008, U.S. Appl. No. 10/369,305.
United States Patent and Trademark Office: Non-Final Office Action dated Oct. 24, 2008, U.S. Appl. No. 10/369,305.
United States Patent and Trademark Office: Final Office Action dated Apr. 13, 2009, U.S. Appl. No. 10/369,305.
United States Patent and Trademark Office: Non-Final Office Action dated Jul. 27, 2009, U.S. Appl. No. 10/369,305.
United States Patent and Trademark Office: Non-Final Office Action dated Jun. 16, 2006, U.S. Appl. No. 10/369,307.
United States Patent and Trademark Office: Non-Final Office Action dated Feb. 21, 2007, U.S. Appl. No. 10/369,307.
United States Patent and Trademark Office: Final Office Action dated Oct. 3, 2007, U.S. Appl. No. 10/369,307.
United States Patent and Trademark Office: Non-Final Office Action dated Apr. 2, 2008, U.S. Appl. No. 10/369,307.
United States Patent and Trademark Office: Final Office Action dated Sep. 5, 2008, U.S. Appl. No. 10/369,307.
United States Patent and Trademark Office: Non-Final Office Action dated Mar. 17, 2009, U.S. Appl. No. 10/369,307.
United States Patent and Trademark Office: Final Office Action dated Oct. 14, 2009, U.S. Appl. No. 10/369,307.
PCT International Preliminary Examination Report on Patentability issued Jan. 23, 2007, in corresponding International Application No. PCT/US2005/026011.
PCT International Search Report mailed Apr. 6, 2006, in corresponding International Application No. PCT/US2005/026011.
Communication issued by the Examining Division dated Oct. 30, 2008, in corresponding EP Application No. 05775427.7.
PCT International Preliminary Examination Report on Patentability issued Dec. 12, 2003, in corresponding International Application No. PCT/US03/11576.
PCT International Search Report mailed Jul. 24, 2003, in corresponding International Application No. PCT/US03/11576.
Communication forwarding Supplementary EP Search Report dated Dec. 20, 2007, in corresponding EP Application No. 03721674.4.
Communication issued by the Examining Division dated Jun. 20, 2008, in corresponding EP Application No. 03721674.4.
PCT International Preliminary Examination Report on Patentability issued Apr. 8, 2004, in corresponding International Application No. PCT/US03/11575.
PCT International Search Report mailed Aug. 26, 2003, in corresponding International Application No. PCT/US03/11575.
Communication forwarding Supplementary EP Search Report dated Dec. 20, 2007, in corresponding EP Application No. 03718402.5.
Communication issued by the Examining Division dated Jun. 20, 2008, in corresponding EP Application No. 03718402.5.
PCT International Preliminary Examination Report on Patentability issued Jun. 14, 2004, in corresponding International Application No. PCT/US03/11577.
PCT International Search Report mailed Jul. 7, 2003, in corresponding International Application No. PCT/US03/11577.
Communication forwarding Supplementary EP Search Report dated Dec. 20, 2007, in corresponding EP Application No. 03746989.7.
Communication issued by the Examining Division dated Jun. 20, 2008, in corresponding EP Application No. 03746989.7.
Shapiro, A., "Fastest Way to Concatenate Strings," Usenet Post to comp.lang.java.programmer, Jan. 31, 1998, 1 page, <http://groups.google.com/group/comp.lang.java.programmer/msg/7ee5c7305d4b8148>.
United States Patent and Trademark Office: Final Office Action dated Dec. 16, 2009, U.S. Appl. No. 10/369,305.
United States Patent and Trademark Office: Non-Final Office Action dated Dec. 30, 2009, U.S. Appl. No. 10/369,307.

* cited by examiner

| offset | 0 | | | | | | | | | | | | | | | | | | | | | | | | | | | | | | | 31 | |
|---|---|---|---|---|---|---|---|---|---|---|---|---|---|---|---|---|---|---|---|---|---|---|---|---|---|---|---|---|---|---|---|---|---|
| | | | | | | | | | | | | | | 32 bits | | | | | | | | | | | | | | | | | | | |
| 0 | 1 | 1 | - | - | - | - | - | - | - | - | - | 11101 | | | | | | - | | | | | | | | 0 | | | | | | | Cookie |
| 4 | L | | | | | | | | | | | | Cookie & Flags | | | | | | | | | | | | | | | | | | | M | |
| 8 | 1 | 1 | - | - | - | - | - | - | - | - | - | 11100 | | | | L | | | | | | | | | | | | | | | | | MAC Addr |
| 12 | | | | | | | | | | | | | Desination MAC Address | | | | | | | | | | | | | | | | | | M | |
| 16 | 1 | 1 | - | - | - | - | - | - | - | - | - | 00001 | | | | | | | | | | 20 | | | | | | | | | | | |
| 20 | L | | | MTU (& padding) | | | | | | | | | | | M | L | | | | Payload Length | | | | | | | | | | | M | IP |
| 24 | Version | | | | Header Length | | | | TOS (type of service) | | | | | | | M | | | | Total Length | | | | | | | | | | | L | |
| 28 | M | | | Identification | | | | | | | | | | | L | Flags | | | M | | Fragment Offset | | | | | | | | | | L | |
| 32 | TTL (time to live) | | | | | | | | Protocol | | | | | | | M | | | | Header Checksum | | | | | | | | | | | L | |
| 36 | M | | | | | | | | | | | Source IP address | | | | | | | | | | | | | | | | | | | L | |
| 40 | M | | | | | | | | | | | Destination IP Address | | | | | | | | | | | | | | | | | | | L | |
| 44 | | | | | | | | | | | | (padding) | | | | | | | | | | | | | | | | | | | | | |
| 48 | 1 | 1 | - | - | - | - | - | - | - | - | - | 00010 | | | | L | | | | | 8 | | | | | | | | | | | M | UDP |
| 52 | | | | | | | | | | | | NULL | | | | | | | | | | | | | | | | | | | | | |
| 56 | M | | | Source Port Number | | | | | | | | | | | L | M | | | | Destination Port Number | | | | | | | | | | | L | |
| 60 | M | | | UDP Length | | | | | | | | | | | L | M | | | | UDP Checksum | | | | | | | | | | | L | |
| 64 | 1 | 0 | - | - | - | - | - | - | - | - | - | 01111 | | | | L | | | | | 6 | | | | | | | | | | | M | PICBE |
| 68 | | | | | | | | | | | | NULL | | | | | | | | | | | | | | | | | | | | | |
| 72 | | | | Payload Data | | | | | | | | | | | | | | | | | | | | | | | | | | | | |
| 76 | | | | | | | | | | | | | | | | | | | | (padding) | | | | | | | | | | | | | |
| 80 | 1 | 0 | - | - | - | - | - | - | - | - | - | 11111 | | | | L | | | Length of TS Packet (188) | | | | | | | | | | | | | M | MPP1 |
| 84 | L | | | | | | | | | | | Address of Media Packet Payload Block 1 | | | | | | | | | | | | | | | | | | | M | |
| 88 | 0 | 1 | - | - | - | - | - | - | - | - | - | 11111 | | | | L | | Length of Media Packet Payload Block 1(8648) | | | | | | | | | | | | | M | MPP2 |
| 92 | L | | | | | | | | | | | Address of Media Packet Payload Block 1 | | | | | | | | | | | | | | | | | | | M | |
| 96 | | | | | | | | | | | | | | | | | | | | | | | | | | | | | | | | | MPP3 |
| 100 | | | | | | | | | | | | | | | | | | | | | | | | | | | | | | | | | |
| 104 | | | | | | | | | | | | | | | | | | | | | | | | | | | | | | | | | MPP4 |
| 108 | | | | | | | | | | | | | | | | | | | | | | | | | | | | | | | | | |
| 112 | | | | | | | | | | | | | | | | | | | | | | | | | | | | | | | | | MPP5 |
| 116 | | | | | | | | | | | | | | | | | | | | | | | | | | | | | | | | | |
| 120 | | | | | | | | | | | | | | | | | | | | | | | | | | | | | | | | | MPP6 |
| 124 | | | | | | | | | | | | | | | | | | | | | | | | | | | | | | | | | |

Fig. 9

FLEXIBLE STREAMING HARDWARE

CROSS REFERENCE TO RELATED APPLICATIONS

This application claims benefit of U.S. provisional patent application Ser. No. 60/374,086, filed Apr. 19, 2002, entitled "Flexible Streaming Hardware," U.S. provisional patent application Ser. No. 60/374,090, filed Apr. 19, 2002, entitled "Hybrid Streaming Platform," U.S. provisional patent application Ser. No. 60/374,037, filed Apr. 19, 2002, entitled "Optimized Digital Media Delivery Engine," and U.S. patent application Ser. No. 60/373,991, filed Apr. 19, 2002, entitled "Optimized Digital Media Delivery Engine," each of which is hereby incorporated by reference for each of its teachings and embodiments.

FIELD OF THE INVENTION

This invention relates to the field of digital media servers.

BACKGROUND OF THE INVENTION

A digital media server is a computing device that streams digital media content onto a digital data transmission network. In the past, digital media servers have been designed using a general-purpose personal computer (PC) based architecture in which PCs provide all significant processing relating to wire packet generation. But digital media are, by their very nature, bandwidth intensive and time sensitive, a particularly difficult combination for PC-based architectures whose stored-computing techniques require repeated data copying. This repeated data copying creates bottlenecks that diminish overall system performance especially in high-bandwidth applications. And because digital media are time sensitive, any such compromise of server performance typically impacts directly on the end-user's experience when viewing the media.

FIG. 1 demonstrates the required steps for generating a single wire packet in a traditional media server comprising a general-purpose PC architecture. The figure makes no assumptions regarding hardware acceleration of any aspect of the PC architecture using add-on cards. Therefore, the flow and number of memory copies are representative of the prior art whether data blocks read from the storage device are reassembled in hardware or software.

Referring now to FIG. 1, in step 101, an application program running on a general-purpose PC requests data from a storage device. Using direct memory access (DMA), a storage controller transfers blocks of data to operating system (OS) random access memory (RAM). In step 102, the OS reassembles the data from the blocks in RAM. In step 103, the data is copied from the OS RAM to a memory location set aside by the OS for the user application (application RAM). These first three steps are performed in response to a user application's request for data from the memory storage device.

In step 104, the application copies the data from RAM into central processing unit (CPU) registers. In step 105, the CPU performs the necessary data manipulations to convert the data from file format to wire format. In step 106, the wire-format data is copied back into application RAM from the CPU registers.

In step 107, the application submits the wire-format data to the OS for transmission on the network and the OS allocates a new memory location for storing the packet format data. In step 108, the OS writes packet-header information to the allocated packet memory from the CPU registers. In step 109, the OS copies the media data from the application RAM to the allocated packet RAM, thus completing the process of generating a wire packet. In step 110, the completed packet is transferred from the allocated packet RAM to OS RAM.

Finally, the OS sends the wire packet out to the network. In particular, in step 111, the OS reads the packet data from the OS RAM into CPU registers and, in step 112, computes a checksum for the packet. In step 113, the OS writes the checksum to OS RAM. In step 114, the OS writes network headers to the OS RAM. In step 115, the OS copies the wire packet from OS RAM to the network interface device over the shared I/O bus, using a DMA transfer. In step 116, the network interface sends the packet to the network.

As will be recognized, a general-purpose-PC architecture accomplishes the packet-generation flow illustrated in FIG. 1 using a number of memory transfers. These memory transfers are described in more detail in connection with FIG. 2.

As shown in FIG. 2, the transfer from storage device 201 to file system cache 202 uses a fast Direct Memory Access (DMA) transfer. The transfer from file system cache 202 to file format data 203 requires each 32 bit word to be copied into a CPU register and back out into random access memory (RAM). This kind of copy is often referred to as a mem copy (or memcpy from the C language procedure), and is a relatively slow process when compared to the wire speed at which hardware algorithms execute. The copy from file format data 203 to wire format data 204 and from wire format data 204 to OS Kernel RAM 205 are also mem copies. Network headers are added to the data while in the OS Kernel RAM 205, which requires a write of header information from the CPU to OS Kernel RAM. Determining the checksum requires a complete read of the entire data packet, and exhibits performance similar to a mem copy. The copy from the OS Kernel RAM 205 to Network Interface Card 206 is a DMA transfer across a shared peripheral component interconnect (PCI) bus. Thus, a total of 5 copies, and 1 complete iterative read into the CPU, of the payload data are required to generate a single network wire packet.

SUMMARY OF THE INVENTION

In a preferred embodiment, the present system and method comprise a hardware engine adapted to transfer media asset data from a media buffer to a network. The hardware engine receives media asset streaming instructions from a general-purpose PC via control blocks stored in the buffer along with the media asset data. The hardware engine eliminates the redundant copying of data and the shared I/O bus, bottlenecks typically found in a general-purpose PC that delivers digital media. By eliminating these bottlenecks, the hardware engine improves overall delivery performance and significantly reduces the cost and size associated with delivering digital media to a large number of end users.

In a preferred embodiment, the hardware engine comprises a programmable logic device (PLD) to provide significantly higher data processing speeds than a general-purpose CPU. Advantageously, such PLDs can be reprogrammed without replacing hardware components such as read-only memories. Consequently, the present system provides flexibility and future-proofing not usually found in a dedicated hardware device, while maintaining hardware-level wire-speed performance.

In addition to extending the life cycle of the hardware solution by providing the ability to incorporate additional functional components in the future, the hardware engine's wire-speed performance increases the number of unique streams that can be processed and delivered by the digital media server. This increase in stream density in a smaller physical package (compared to servers that use a general-purpose PC architecture) leads to improved scalability which can be measured by reduced space requirements and lower environmental costs, such as air conditioning and electricity. Because each server unit has a higher stream density than previous media server units, fewer servers are required, which directly relates to a smaller capital investment for deployment of streaming video services. Fewer servers also result in lower operating costs such as reducing the need for operations personnel to maintain and upgrade the servers.

In one aspect, the present invention is directed to a system under the control of a general-purpose computer for converting digital media assets into wire data packets for transmission to a client, the assets being stored on a digital media storage device comprising an input interface for retrieving digital media asset data from the storage device, a media buffer for receiving the digital media asset data from the storage interface, a programmable logic device adapted to transfer the digital media asset data from the input interface to the media buffer, process the digital media asset data from the media buffer, and generate wire data packets, a network interface coupled to the device and adapted to transmit the wire data packets to the client, and a general-purpose interface coupled to the device and adapted to receive control information from the general-purpose computer for storage in the media buffer and to enable the device to communicate with the general-purpose computer.

In another aspect of the present invention, the media buffer is further adapted to store control blocks comprising packet header formatting instructions and digital media asset payload information, and the programmable logic device is further adapted to generate packet headers from the instructions.

In another aspect of the present invention, the digital media asset payload information comprises a pointer to the digital media asset data.

In another aspect of the present invention, the digital media asset payload information comprises the digital media asset data.

In another aspect of the present invention, the programmable logic device is a field programmable gate array.

In another aspect of the present invention, the network interface comprises a Gigabit Ethernet interface.

In another aspect of the present invention, the data generation rate is greater than or equal to the data transmission rate, the programmable logic device data reception rate is greater than or equal to the data generation rate, and the media buffer data reception rate is greater than or equal to the programmable logic device data reception rate.

In another aspect of the present invention, two or more programmable logic devices cooperatively increase the data transmission rate of the system.

In another aspect of the present invention, the programmable logic device comprises an MPEG-2 stitching engine for targeted ad insertion.

In another aspect of the present invention, the programmable logic device is further adapted to encrypt the data stream thereby increasing the quality of content security.

In another aspect, the present invention is directed to a secure method of providing an upgrade package for changing the logic in a field programmable gate array used as an engine for streaming digital media, comprising encrypting the upgrade package, compressing the upgrade package, distributing the upgrade package, decompressing the upgrade package, loading the package into the field programmable gate array, supplying a key to the field programmable gate array for decrypting the upgrade package, and rebooting the field programmable gate array; thereby installing the upgrade package.

In another aspect, the present invention is directed to a method of streaming a block of a digital media asset across a digital network using a hardware engine, comprising transferring the block of the asset into a media buffer, writing wire packet generation control instructions into the media buffer, fragmenting the block into one or more data packets, generating packet headers for a packet in accordance with the instructions, calculating a checksum for the packet, transmitting the packet onto the network, and repeating the generating, calculating, and transmitting steps until all the data packets have been transmitted.

In another aspect of the present invention, the method further comprises the steps of receiving a message to process the instructions and sending a message that the block has been sent.

In another aspect, the present invention is directed to a method for designing a streaming media hardware engine, comprising: (a) identifying one or more components that comprise the hardware engine, (b) designing a last component having a fully saturated output bandwidth greater than or equal to the required bandwidth of the hardware engine (c) calculating the input bandwidth required to fully saturate the designed component, (d) designing an adjacent preceding component having a fully saturated output bandwidth greater than or equal to the input bandwidth calculated in step (c), and recursively repeating steps (c) and (d) for remaining components identified in step (a).

BRIEF DESCRIPTION OF THE DRAWINGS

FIG. 9 is an example control block for an MPEG-2 file streamed over UDP/IP;

DESCRIPTION OF THE PREFERRED EMBODIMENTS

Hardware Engine Components

Figure 1:
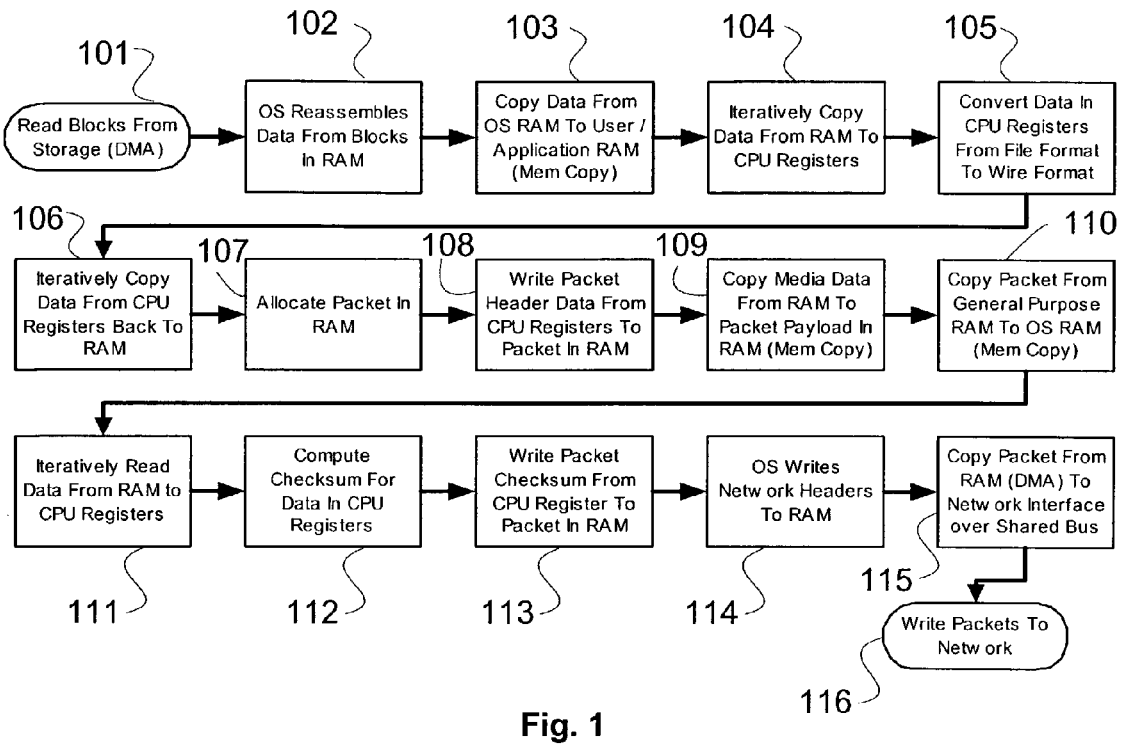
FIG. 1 is a flow chart illustrating a process for generating wire data packets in a general-purpose personal computer.
Figure 2:
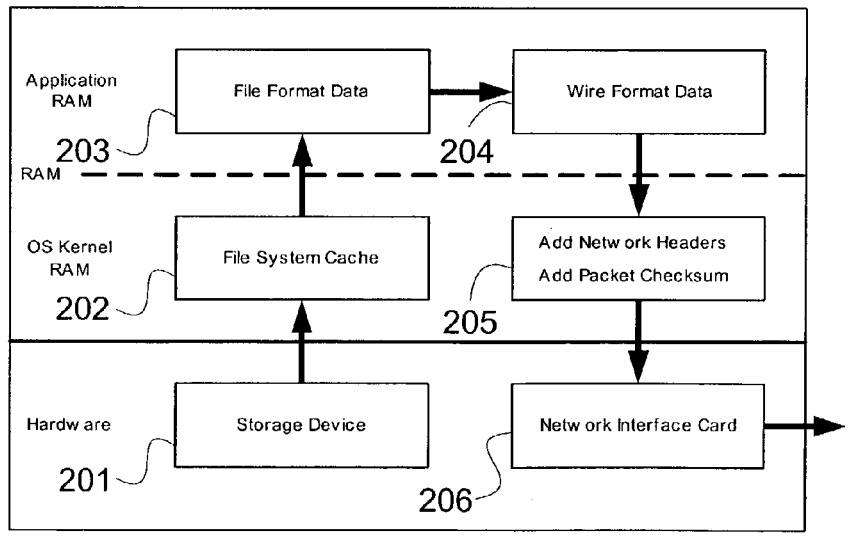
FIG. 2 is a block diagram that illustrates hardware and software components in a general-purpose personal computer used to generate a wire packet.
Figure 3:
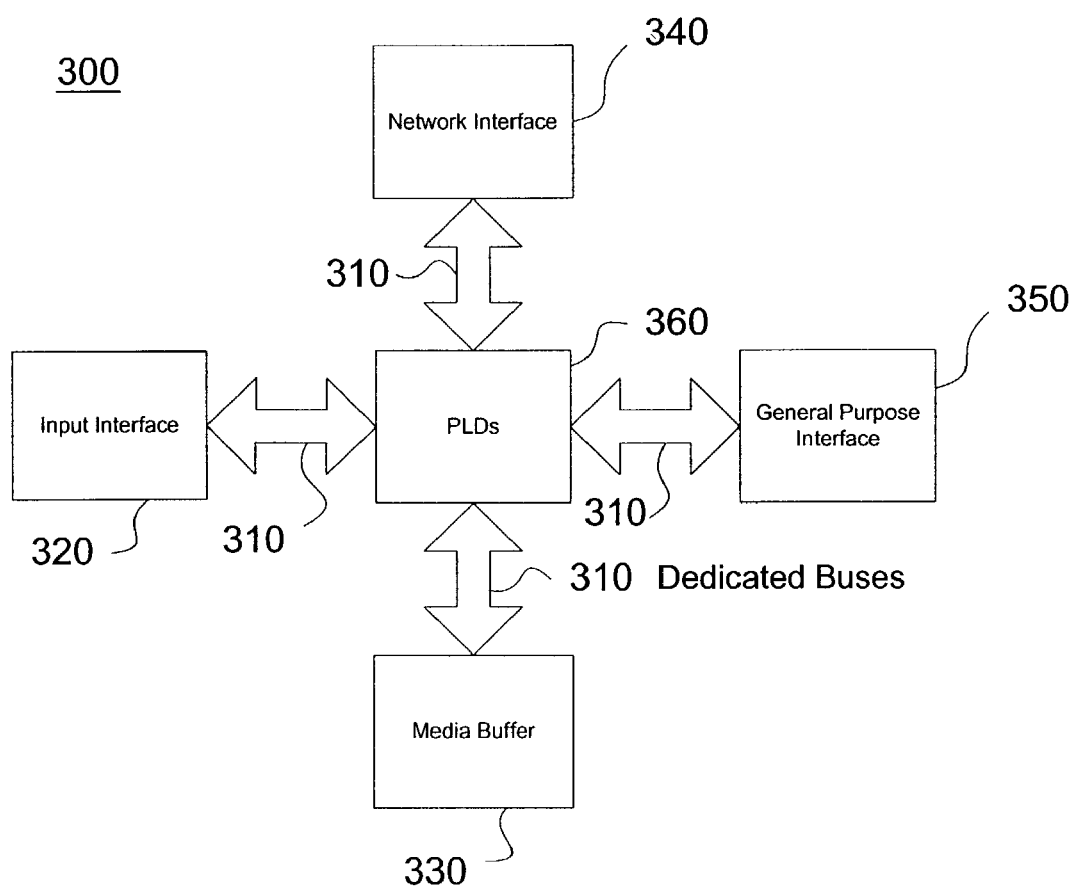
FIG. 3 is a block diagram that illustrates components of a hardware engine in one embodiment.

One preferred embodiment of a hardware engine for streaming digital media assets is shown in FIG. 3. As shown in FIG. 3, hardware engine 300 preferably comprises several components including dedicated buses 310, an input interface 320, a media buffer 330, a network interface 340, a general-purpose interface 350, and one or more programmable logic devices (PLDs) 360. Dedicated buses 310 provide an exclusive data pathway between PLD 360 and other hardware engine components. Input interface 320 is preferably adapted to control data storage devices containing media assets to be streamed and transmits asset data through PLD 360 to media buffer 330, as described below. Network interface 340 provides a controller for communicating with other devices across a data network. General-purpose interface 350 provides a controller for communicating with a general-purpose computing device. PLD 360 translates asset data that is held in media buffer 330 into wire data packets and sends the packets out to the network through network interface 340.

Figure 4:
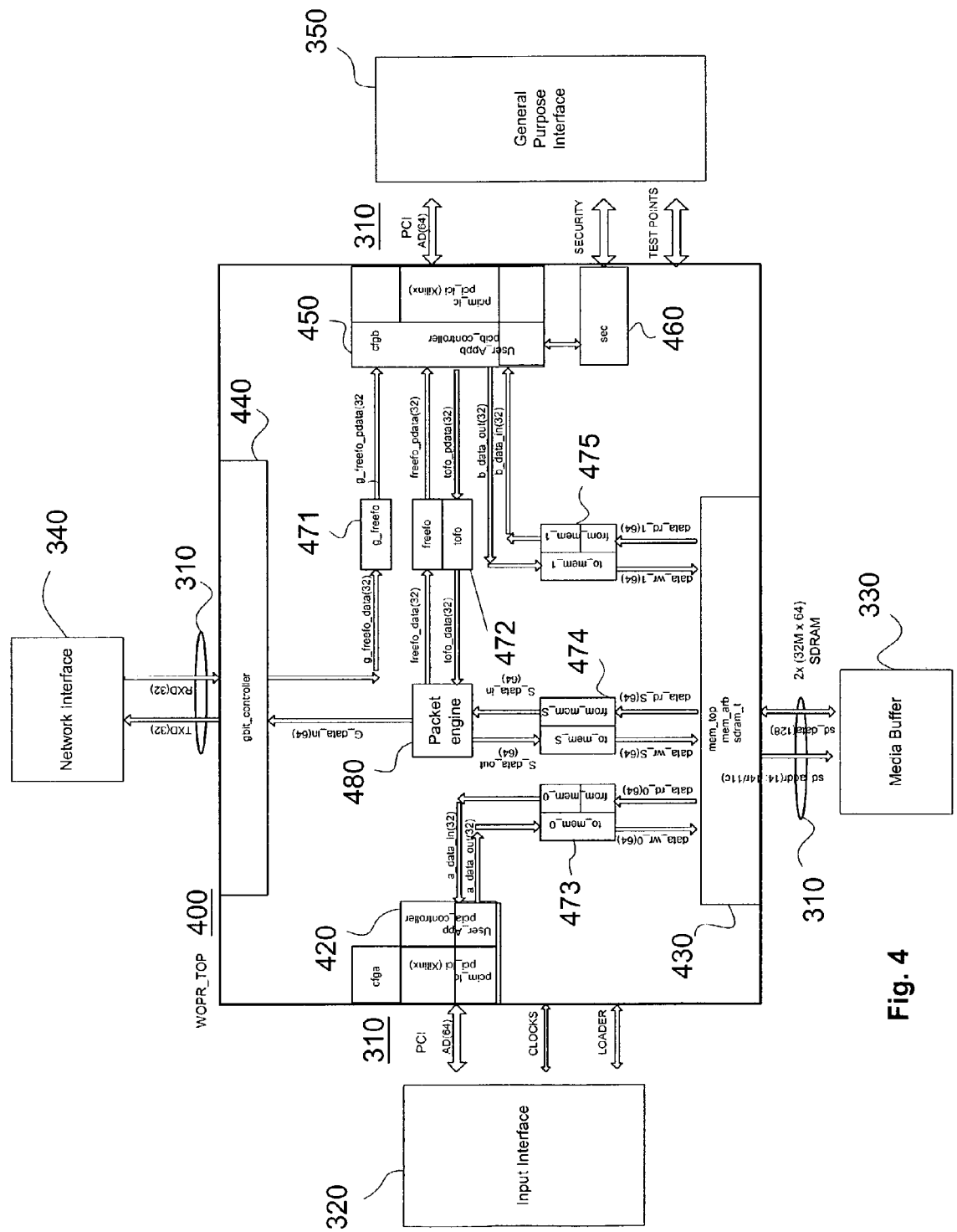
FIG. 4 is a block diagram that illustrates an embodiment of the hardware engine that uses a field programmable gate array, and depicts the internal architecture of same.

FIG. 4 is a block diagram depicting a preferred embodiment of PLD 360. In the preferred embodiment of FIG. 4, PLD 360 comprises a Field Programmable Gate Array (FPGA) device. Those skilled in the art will recognize that other PLDs may alternatively be used.

As shown in FIG. 4, FPGA device 400 preferably comprises a plurality of objects created using Hardware Description Language (HDL). These HDL objects preferably comprise interface objects 420-460, a series of first-in, first-out (FIFO) queues 471-475, and a packet engine 480. Interface objects 420-460 provide the necessary control and addressing signals through dedicated buses 310 to communicate with interface devices 320-350. FIFO queues 471-475 provide internal data communication paths between interface objects and packet engine 480. Packet engine 480 converts asset data held in media buffer 330 into wire data packets that are sent out to the network.

In more detail, interface objects 420-460 preferably comprise a storage peripheral component interface (PCI) interface 420, a media buffer interface 430, a gigabit Ethernet controller interface 440, a general-purpose PCI interface 450, and a security interface 460. Interface HDL objects 420-460 provide the signals required to send or receive data from the FPGA to components 320-360, respectively.

The series of FIFO queues preferably comprises five sets of FIFO queues 471-475. FIFO queue HDL objects 471-475 buffer the flow of data between the interface HDL objects and packet engine 480 in FPGA device 400.

Figure 5:
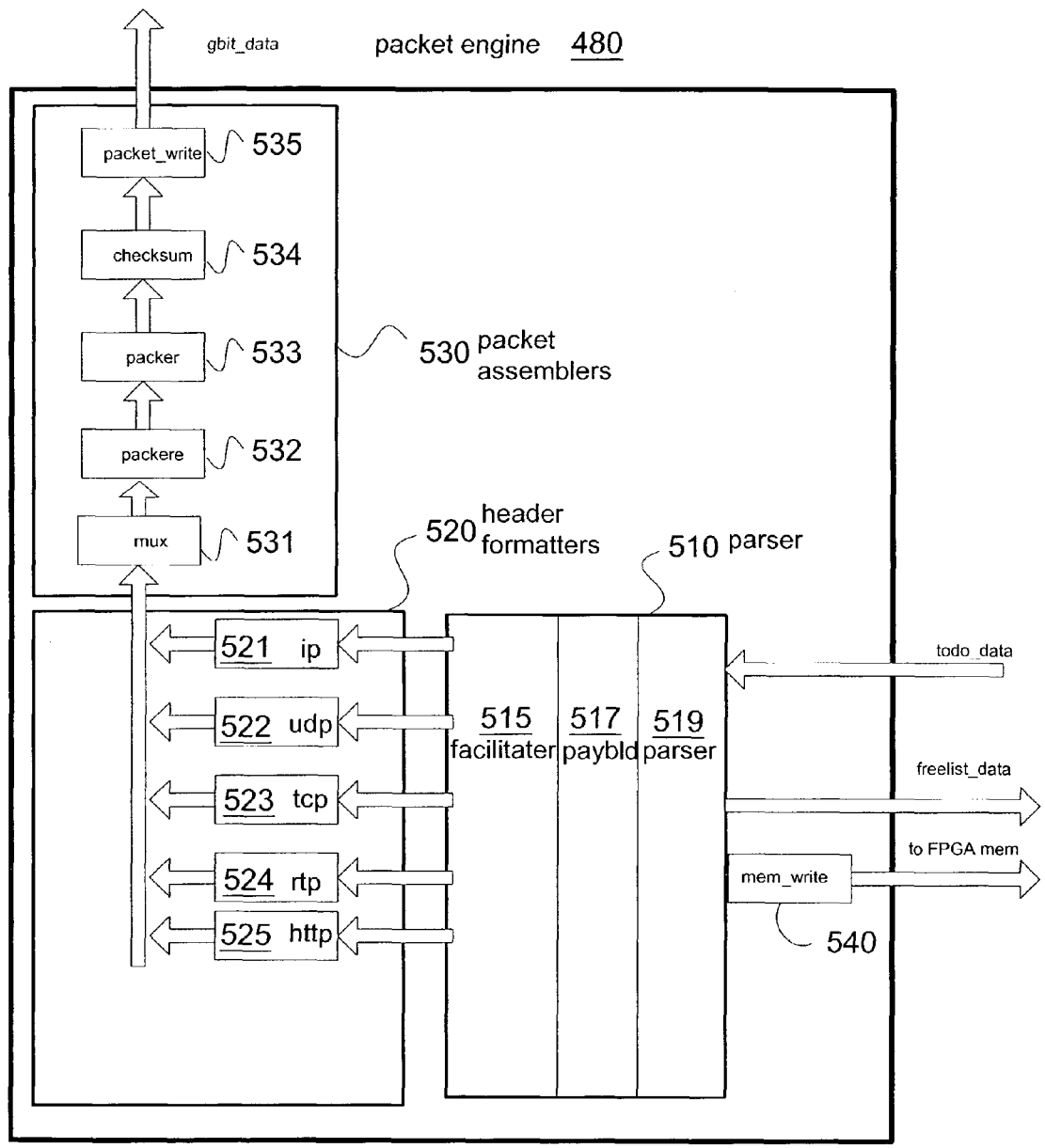
FIG. 5 is a block diagram that illustrates an embodiment of the internal architecture of a format conversion and packet generation engine found in the field programmable gate array.

FIG. 5 is a block diagram of a preferred embodiment of packet engine 480. As shown in FIG. 5, engine 480 preferably comprises a collection of state machines. There are three main groups of state machines: parser state machines 510, header formatter state machines 520, and packet assembler state machines 530. Parser state machines 510 read control blocks stored in media buffer 330 and retrieve the associated media asset data for processing. Header formatter state machines 520 generate the protocol headers for the communications protocols used in each data packet. Packet assembler state machines 530 create wire data packets by connecting the generated packet headers with the asset data and generating checksums for the data. Packet engine 480 further comprises memory writing state machine 540 for sending information back to media buffer 330. Memory writing state machine 540 updates control block entries for TCP, and RTP packets, as described below in the Streaming Media Operation section.

Parser state machines 510 preferably comprise three components, a control block parser 519, a payload builder 517, and a facilitator 515. Control block parser 519 is adapted to read a control block stored in media buffer 330 and pass appropriate data from the control block to header formatting state machines 520. Under control of control block parser 519, payload builder 517 reads asset data from media buffer 330. Facilitator 515 is adapted to schedule the output from packet header formatters 520.

Packet header formatter state machines 520 preferably comprise state machines that produce packet headers which adhere to the communication protocols necessary for streaming video across an Internet Protocol data network including IP 521, UDP 522, TCP 523, RTP 524 and HTTP 525. Each packet header formatter is responsible for generating a packet header in the appropriate format for inclusion in the wire packet. The packet headers are preferably generated from control block data determined by control block parser 519.

Packet assembly state machines preferably comprise a multiplexer 531, a payload packer engine 532, a header packer 533, a checksum generator 534, and a packet writer 535. Multiplexer 531 multiplexes the output of the various header format state machines and the payload builder into packets. Payload packer engine 532 shifts and concatenates the data to eliminate empty bytes in the packet data stream. Packer 533 shifts and concatenates the packet headers to eliminate empty bytes in the packet data stream. Checksum generator 534 generates the checksum of the wire data packet. Packet writer 535 sends the wire data packet out to the gigabit Ethernet controller. It manages payload buffers included in gigabit Ethernet controller 440, inserts checksums into the packet data stream, and creates a data entry indicating that the asset has been sent.

In an alternative preferred embodiment, packet engine 480 may include additional packet generation and protocol engines that replace many of the algorithms traditionally executed on a general-purpose CPU. For example, packet engine 480 may comprise an MPEG-2 stitching engine for targeted ad insertion, or a unique stream-encryption engine for increasing the quality of content security.

Design Methodology for Hardware Engine

Each component in hardware engine 300 is designed specifically for the sustained delivery of digital media so that any given component will not restrict the flow of data and form a bottleneck in the device. Preferably, the criterion used to calculate how much input bandwidth is required for a component is determined from the full bandwidth saturation of the output interface of the component. By determining the amount of input bandwidth that will achieve a desired output bandwidth for a particular component, the output bandwidth of its upstream component can be selected so that the upstream component will supply at least the bandwidth required at the component's input to saturate its output.

This design principle is preferably applied to all components in hardware engine 300, including those that may have a higher input bandwidth than output bandwidth at full saturation. This situation may occur where some of the data supplied to a component is not transmitted by the component.

Illustratively, a component that reads data storage blocks from a hard drive and processes the blocks into data packets may not use the entire contents of the block. The packet data required may be slightly larger than one block, requiring that two blocks be read into media buffer 330. Although two full blocks are read, only a small percentage of the second block is required for generating the packet. Thus, the output bandwidth for the component may be less than its input bandwidth.

Figure 6:
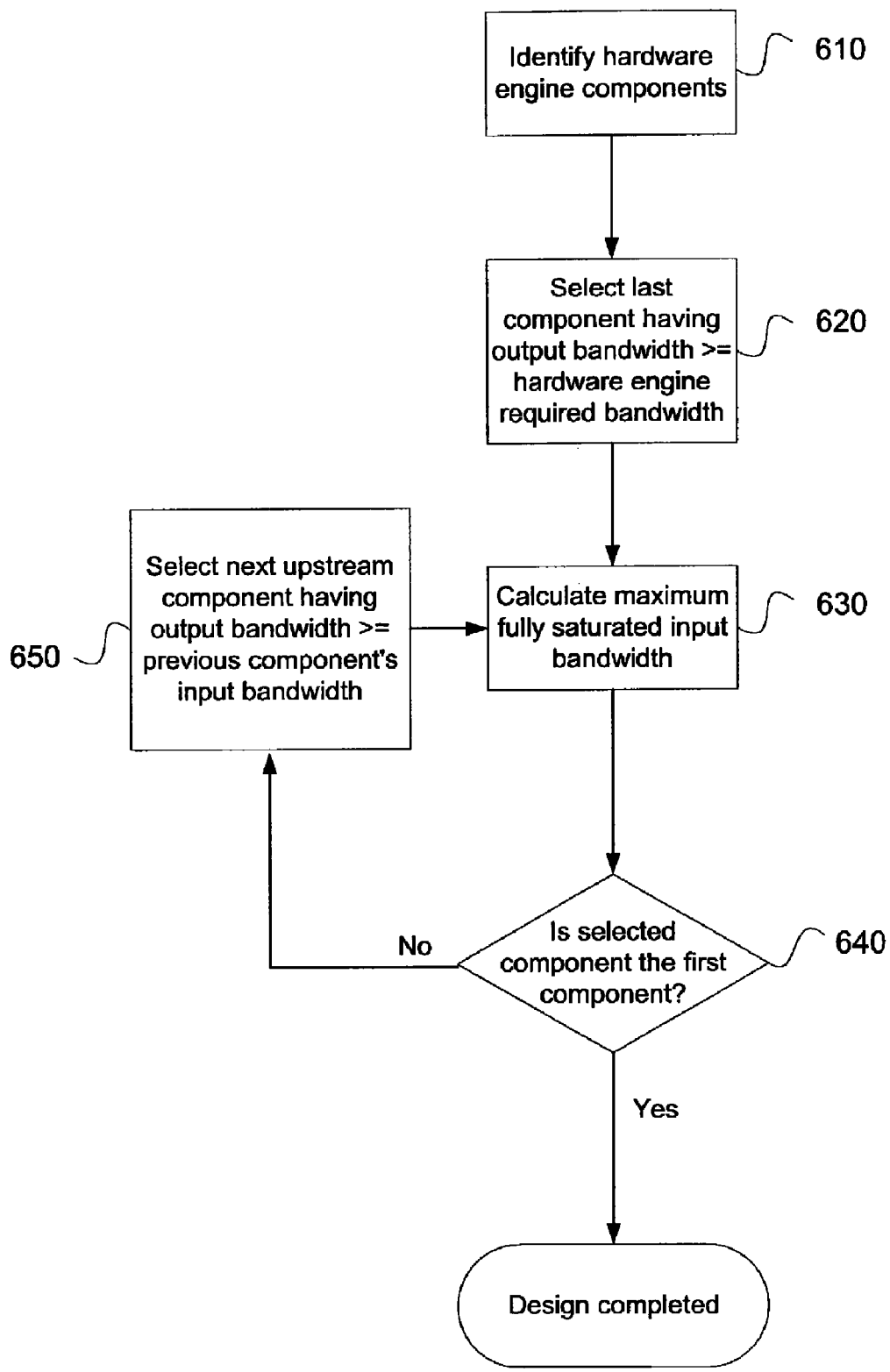
FIG. 6 is a flow chart that illustrates an embodiment of the design methodology for a media asset streaming hardware engine.

This design process is illustrated in more detail in FIG. 6. In step 610, the components of the hardware engine are identified. Then, the components in the data stream generating chain are evaluated in reverse order. In step 620, the last component in the data stream generation chain is designed so that it has an output bandwidth greater than or equal to the required bandwidth that the hardware engine must supply. Next, the input necessary to saturate this output is calculated based on the selected component's functions and data it processes (step 630). If the selected component is not the first component in the data streamer generation chain (step 640), the next upstream component is designed to have an output bandwidth greater than or equal to the calculated input bandwidth of the previously selected component (step 650). Once the first component has been evaluated (step 640), the design process is complete.

Because the throughput of each component and bus are selected or designed to fully saturate the next component, bottlenecks within the device are eliminated and the device operates with fully saturated output connections.

Reprogramming the FPGA

In a preferred embodiment, upgrade packages may be used to reprogram the FPGA using the hardware description language (HDL). By replacing the FPGA's configuration, the HDL components included in the FPGA are changed. The process for installing an upgrade package is illustrated in FIG. 7.

Figure 7:
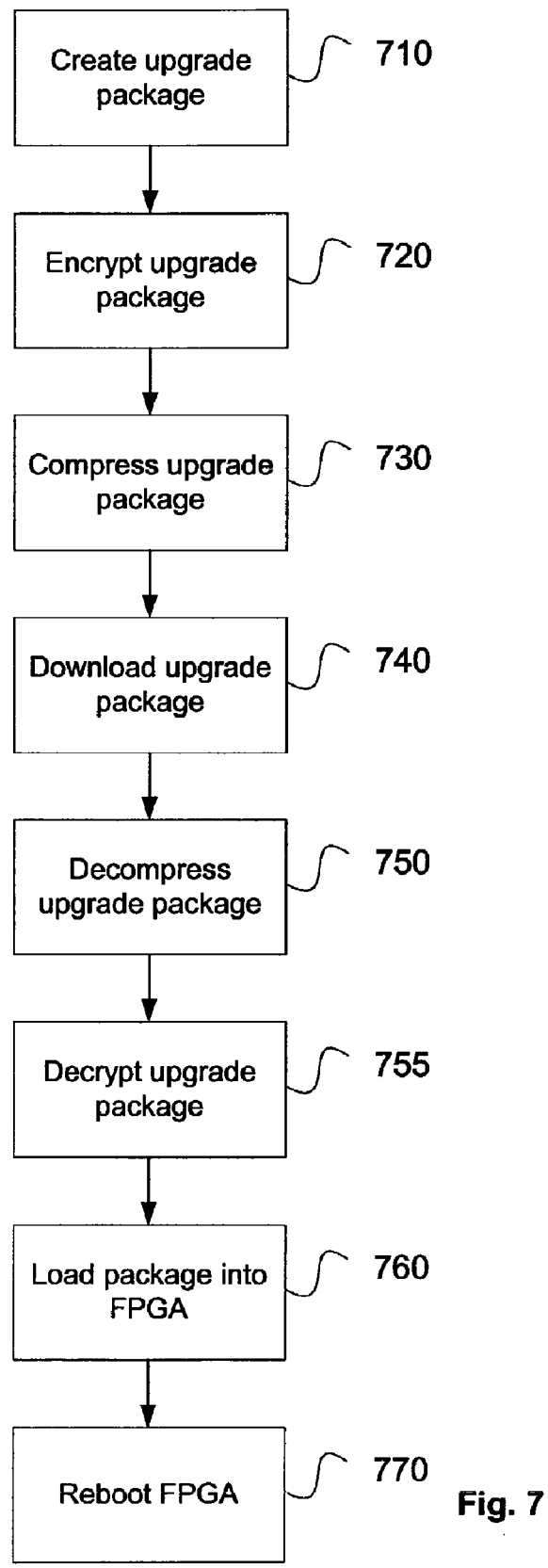
FIG. 7 is a flow chart that illustrates an embodiment of the installation of an upgrade package in an FPGA.

As shown in FIG. 7, in step 710 upgrade packages are created to replace the configuration in the FPGA. In step 720, these packages are preferably encrypted to protect their contents from scrutiny, and in step 730, compressed for distribution. The upgrade package may then be downloaded (step 740), decompressed (step 750), and decrypted (step 755) before it is copied into the FPGA (step 760). In step 770, after the upgrade package is loaded into the FPGA, the FPGA is stopped and rebooted. When the system restarts, the FPGA is reloaded with the upgraded logic.

In a preferred embodiment, security interface 560 protects the logic programmed into the FPGA from being copied. As known in the art, different security interfaces may be designed or purchased that provide varying degrees of security and implementation overhead. Those skilled in the art may balance competing desires to maximize security while minimizing implementation time and cost in selecting an appropriate security interface for the FPGA.

The flexibility achieved by reprogramming the hardware device is illustrated by the following example. Suppose that the initial hardware description language implemented in the FPGA includes packetization algorithms and protocols specific to MPEG-2 transport streams. In the future, users may require delivery of media content in other formats such as MPEG-4. Because hardware engine 300 comprises an FPGA, new algorithms for manipulating MPEG-4 formats can be added to the layout of the chip using HDL in the form of an upgrade package.

FSH Streaming Media Operation

In operation, hardware engine 300 assembles wire packets in accordance with instructions specified in a control block found in media buffer 330. In a preferred embodiment the control block is a 128-byte data structure comprising a series of control block entries (CBE) of at least eight bytes in length. Each CBE either contains data that will be part of a media packet, or a pointer to that data. The media packet can be constructed by traversing the entire control block and concatenating the data contained in each entry or data pointed at by each entry.

Figure 8:
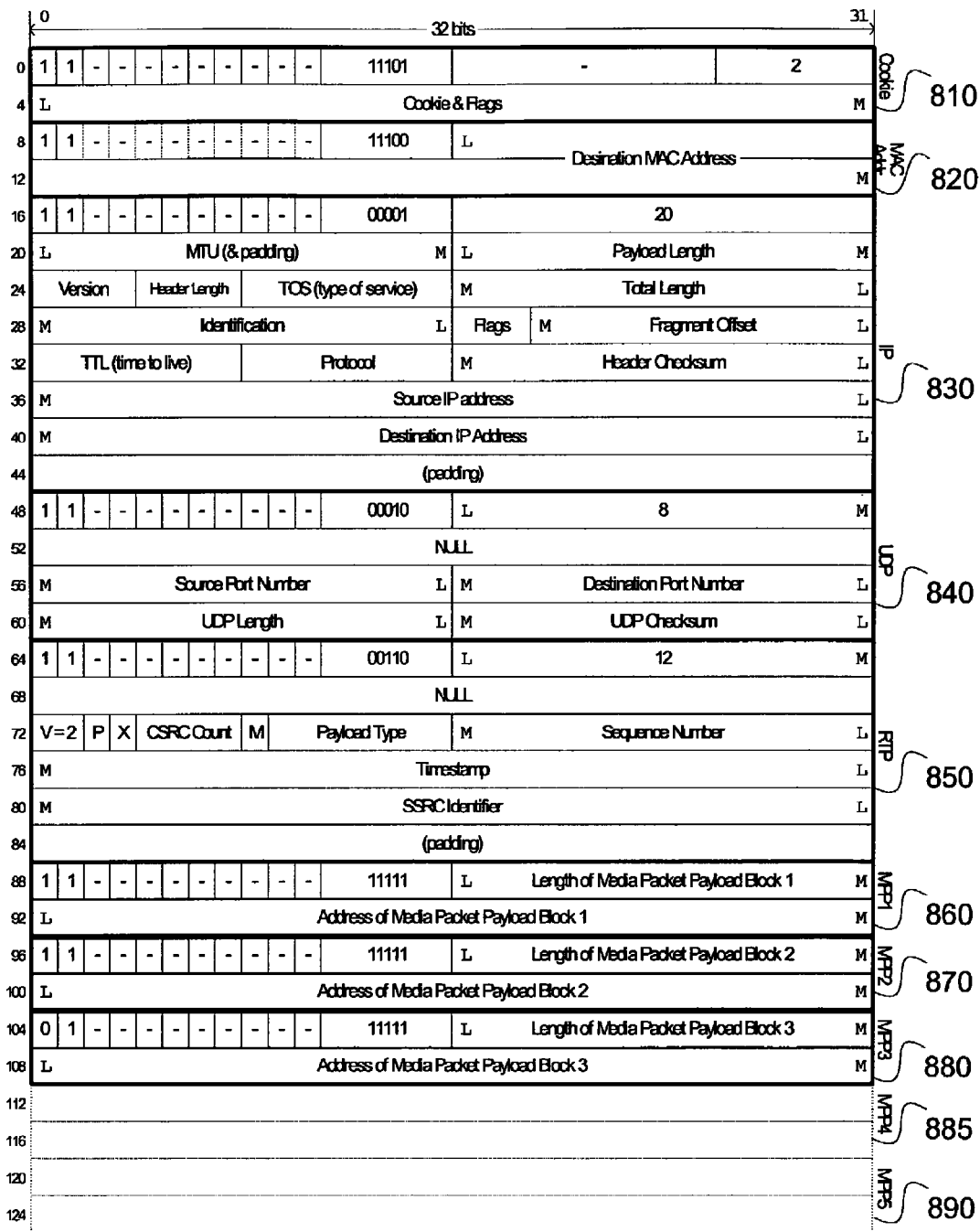
FIG. 8 is an example control block for a Quick Time media file streamed over RTP/UDP/IP.

FIG. 8 illustrates an exemplary control block for a Quick Time media file streamed over RTP/UDP/IP. The exemplary control block comprises a cookie control block entry 810 that uniquely identifies a data stream. The exemplary control block further comprises a series of format CBEs 820-850, along with a series of one or more media packet payload CBEs 860-890. Media packet payload CBEs 860-890 identify the address of the associated media packets in media buffer 330. Hardware engine 300 processes control blocks and associated media packet payload data to generate wire data packets, as described below.

FIG. 9 is an example control block for an MPEG-2 file streamed over UDP/IP. Analogous control blocks may be created for use with other public domain or proprietary streaming formats. Each such control block also comprises a cookie control block entry, one or more format CBEs, and one or more media packet payload CBEs.

Figure 10:
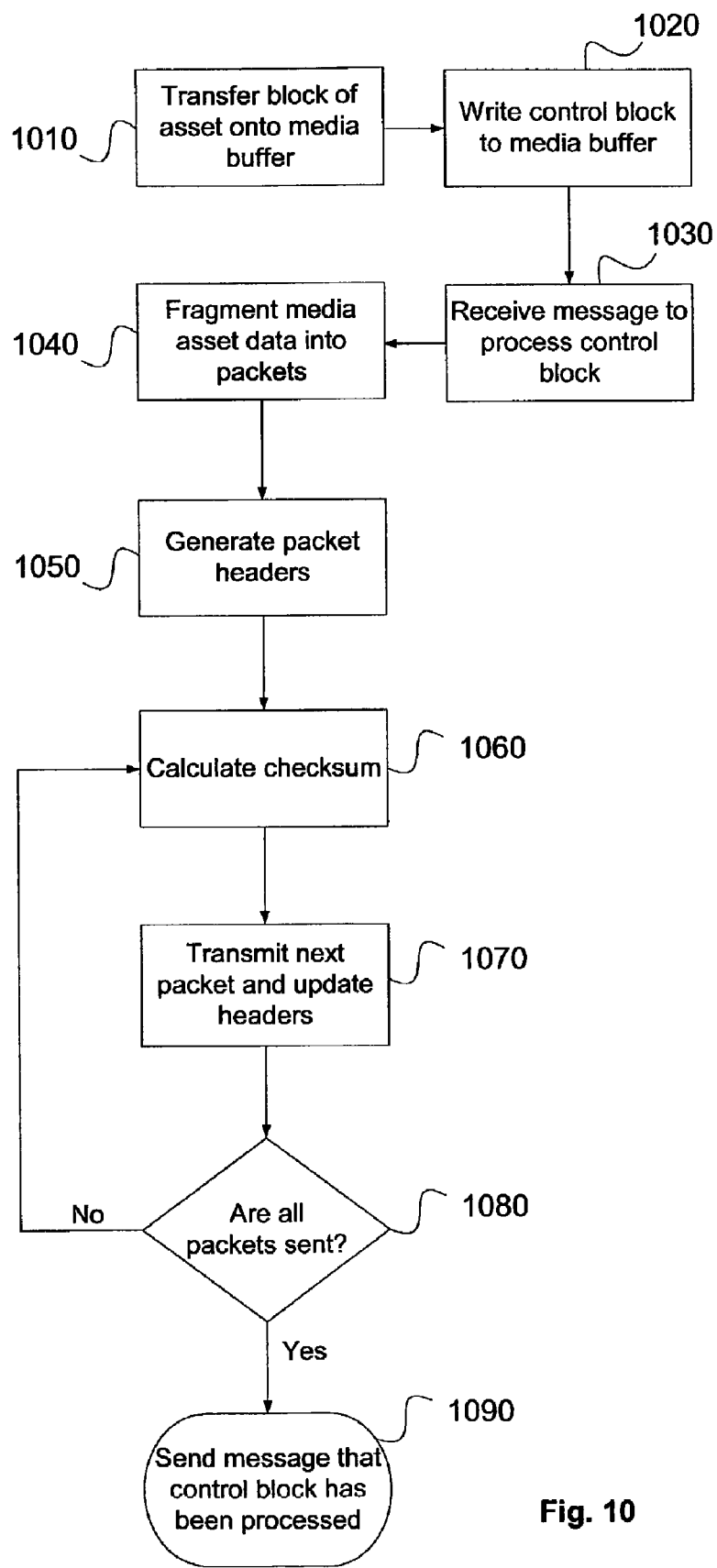
FIG. 10 is a flow diagram illustrating the process of generating wire packets in a preferred embodiment.

FIG. 10 illustrates a preferred embodiment of a process for streaming media. As shown in FIG. 10, in step 1010, a block of media asset data is moved from data storage through the hardware engine's input interface 310 and placed into media buffer 330 under control of a general-purpose PC as described in copending U.S. patent application No. 60/374,090, entitled "Hybrid Streaming Platform," filed on even date herewith, which is hereby incorporated by reference in its entirety for each of its teachings and embodiments. In step 1020, a control block is written to media buffer 330. The control block preferably identifies the location of the media asset in the media buffer and includes instructions for processing the media asset data. In step 1030, hardware engine 300 receives a data message to commence streaming the media asset data. The message preferably contains a pointer to the control block and a stream identifier corresponding to the control block.

Engine 300 then converts the media packet payload from file format to wire format. If the media packet is larger than the maximum transmission unit (MTU), this conversion process preferably comprises fragmentation of the media packet into several wire format data packets (step 1040). In step 1050, engine 300 generates protocol format headers specified in the CBEs for insertion into the wire packet. Next, in step 1060, engine 300 assembles the packet and calculates a checksum for the wire packet. In step 1070, engine 300 sends a wire packet out thorough gigabit Ethernet interface 340. If the last wire packet has not been sent (step 1080), engine 300 updates packet headers and checksum and sends the next wire packet. After the last packet has been transmitted, engine 300 generates a message that indicates the control block has been processed.

Figure 11:
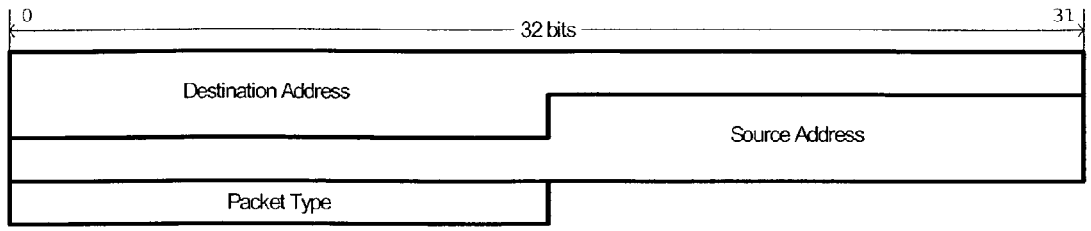
FIG. 11 is a diagram of the Ethernet header or media access control layer (MAC) control block entry structure.

A preferred header-formatting process is now described in more detail. In a preferred embodiment, engine 300 adds an Ethernet header to every packet unless the control block has a "pass thru" identifier. The Ethernet header control block contains a source address, destination address, and a packet type field. In a preferred embodiment, header information for the Ethernet header is included in a CBE, as shown, for example, in FIG. 11. When transmitting packets, engine 300 preferably uses the same Ethernet header information from the control block for every packet in a particular stream. If necessary, the destination address can be changed as directed by a separate CBE. Each packet is also preferably provided with any additional headers required by its associated CBE.

Figure 12:
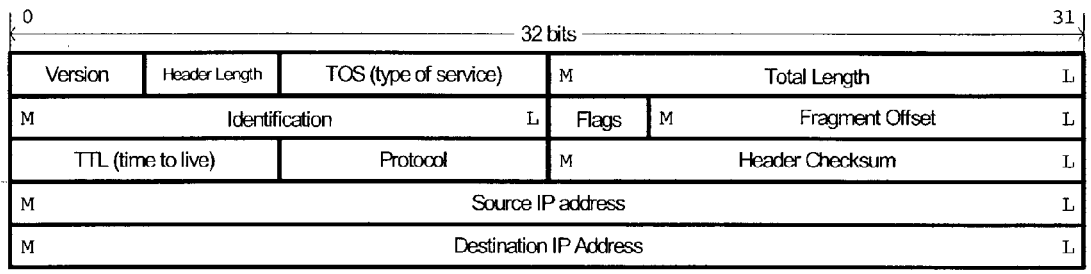
FIG. 12 is a diagram of the internet protocol (IP) header control block entry structure.

In a preferred embodiment, when the packet includes an IP header, the CBE preferably includes the following fields, illustrated in FIG. 12: a version, a header length, a type-of-service field, a total length, an identification field, flags, a fragment offset, a time-to-live field, a protocol byte field, a header checksum, a source IP address and a destination IP address. Before sending the wire packet, engine 300 preferably performs the following functions. First, engine 300 computes the total length in bytes by adding up the length fields from all CBEs. Next, engine 300 computes the header checksum by setting the field to zero, then computing the 16-bit sum over the IP header only. Finally, engine 300 stores the 16-bit ones-complement of the sum in the header checksum field, and copies the other fields to generate the IP packet header.

Figure 13:
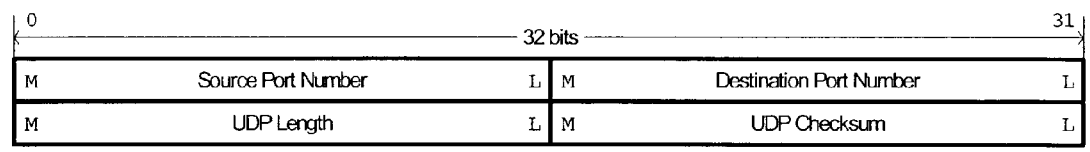
FIG. 13 is a diagram of the user datagram protocol (UDP) header control block entry structure.

In a preferred embodiment, when the packet includes a UDP header, the CBE preferably includes fields for a source port number, destination port number, UDP length, and UDP checksum fields as shown in FIG. 13. Before sending the wire packet, engine 300 preferably performs the following functions. First, engine 300 computes the UDP length by adding up the length fields from all CBEs including and after the one pointing to the UDP header. Then, engine 300 computes the UDP checksum by performing a 16-bit add of the source IP address field from the IP packet header, the destination IP address field from the IP header, the protocol field (as the lower 8 bits) from the IP header, the UDP length as calculated above, and the entire UDP header, plus the remaining wire packet headers and media packet payload. Then the ones-complement of the sum is stored in the UDP checksum field, and the remaining fields are copied into the UDP header from the UDP control block. For more details of the generation of IP/UDP packets by hardware engine 300, see copending U.S. patent application Ser. No. 10/369,307, entitled "Optimized Digital Media Delivery Engine," filed on even date herewith, which is hereby incorporated by reference in its entirety for each of its teachings and embodiments.

Figure 14:
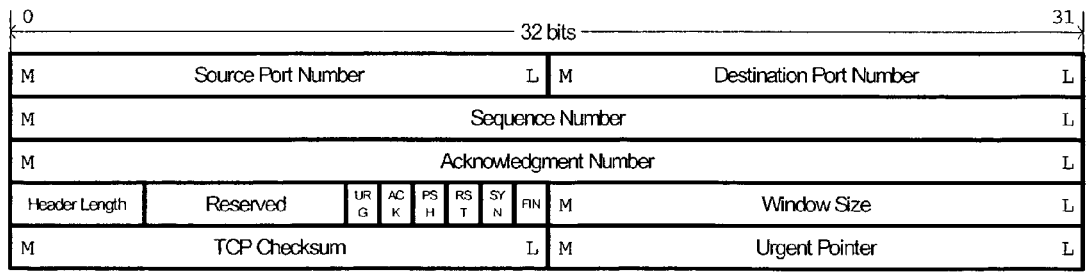
FIG. 14 is a diagram of the transport control protocol (TCP) header control block entry structure.

In a preferred embodiment, when the packet includes an TCP header, the CBE preferably includes fields for a source port number, destination port number, a sequence number, an acknowledgment number, a header length, a reserved field, flags, a window size, a TCP checksum, and an urgent pointer, as shown in FIG. 14. Before sending the wire packet, engine 300 preferably performs the following functions. First, the TCP checksum is calculated by performing a 16-bit add of the source IP address from the IP header, the destination IP address from the IP header, the protocol field (as the lower 8 bits) from the IP header, the total-length field from the IP header, the entire TCP header, plus the remaining wire packet headers and media packet payload. Then the ones-complement of the sum is stored in the TCP checksum field, and the remaining fields are copied from the TCP CBE to generate the TCP packet header.

After sending the wire packet, engine 300 preferably increments the sequence number in the TCP control block entry. If the TCP packet is segmented, the sequence number is preferably updated in every wire data packet sent, but the sequence number in the control block is incremented after the entire media packet has been processed.

Figure 15:
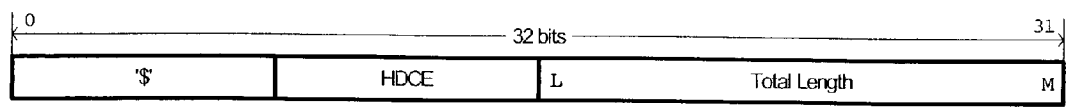
FIG. 15 is a diagram of the hypertext transport protocol (HTTP) header control block entry structure.

In a preferred embodiment, when the packet includes an HTTP header, the CBE preferably contains a "$" character, an HDCE byte field, and a total length field, as shown in FIG. 15. Before sending the wire packet, engine 300 preferably fills in the total length field based on the payload length field from the IP CBE and any headers that follow the HTTP header, such as RTP, to generate the HTTP packet header.

Figure 16:
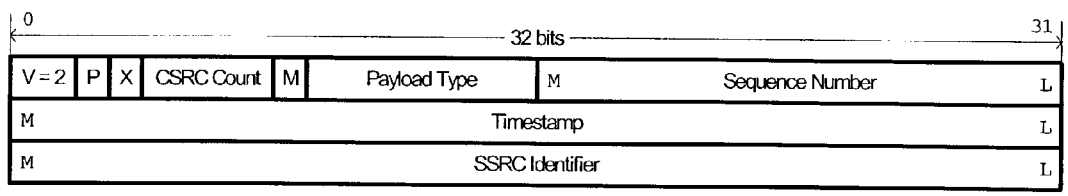
FIG. 16 is a diagram of the realtime transport protocol (RTP) header control block entry structure.

In a preferred embodiment, when the packet includes an RTP header, the CBE preferably includes flags, a CSRC count field, a payload type field, a sequence number, a timestamp, and a SSRC identifier, as shown in FIG. 16. Engine 300 copies the RTP CBE in order to generate the RTP packet header before sending out the wire packet.

After sending the wire packet, engine 300 preferably increments the sequence number field in the RTP CBE by 1.

Figure 17:
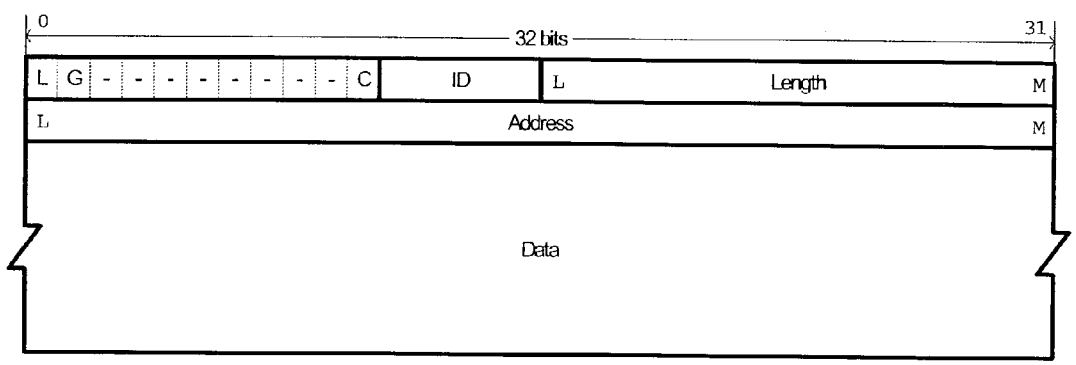
FIG. 17 is a diagram of the payload data control block entry structure.

In a preferred embodiment, the control block contains a payload data CBE, as shown in FIG. 17. The payload CBE contains a flag field, ID field, payload length field, and either an address to the payload data or a null value if the ID field indicates that the payload data is appended to the end of the CBE. The length field is used by engine 300 to determine whether to fragment the payload and for inclusion in the packet header fields. The address field is used by engine 300 to locate the payload data in media buffer 330.

In an alternative preferred embodiment, multiple PLDs may be pipelined together to execute additional algorithms, or more complex algorithms, in tandem. Embodiments comprising multiple PLDs preferably comprise additional communications structures in the PLD for inter-process communications between the PLDs in order to execute parallel algorithms.

While the invention has been described in conjunction with specific embodiments, it is evident that numerous alternatives, modifications, and variations will be apparent to those skilled in the art in light of the foregoing description.

What is claimed is:

1. A server system for transmitting digital media asset data to a client, comprising:
    a programmable logic device configured to generate a wire data packet according to control information, said control information contained in a control block for storage in a media buffer, said control block comprising:
        a first plurality of control block entries,
        a second plurality of control block entries, and
        said control information,
            wherein individual entries of the first plurality of control block entries comprise a pointer to a first subset of media packet payload data, and
            wherein individual entries of the second plurality of control block entries comprise a second subset of media packet payload data,
        said programmable logic device comprising:
            a parser state machine configured to read said control block and generate a media packet payload by:
                determining an address in said media buffer for the first subset of media packet payload data referenced by the pointer in ones of the first plurality of control block entries and determining the second subset of media packet payload data contained in ones of the second plurality of control block entries, and
                concatenating the first subset of media packet payload data referenced by the ones of the first plurality of control block entries and the second subset of media packet payload data contained in the ones of the second plurality of control block entries according to the control information;
            a header formatter state machine configured to:
                generate a first header associated with a first protocol according to said control information, and generate a second header associated with a second protocol according to said control information; and a packet assembler state machine configured to:
multiplex said first header, said second header, and said media packet payload, and
assemble said wire data packet comprising said multiplexed first header, second header, and media packet payload.

2. The system of claim 1, wherein said control information comprises packet header formatting instructions and digital media asset payload information.

3. The system of claim 1, wherein a media buffer data reception rate is greater than or equal to a programmable logic device data reception rate.

4. The system of claim 1, wherein said first protocol is User Datagram Protocol (UDP) and said second protocol is Internet Protocol (IP).

5. The system of claim 1, wherein the programmable logic device is a field programmable gate array.

6. The system of claim 1, further comprising a network interface configured to transmit said wire data packet at a wire data packet transmission rate, wherein said programmable logic device is further configured to generate a plurality of wire data packets at a wire data packet generation rate greater than or equal to the wire data packet transmission rate.

7. The system of claim 6, wherein a programmable logic device data reception rate is greater than or equal to the wire data packet generation rate.

8. The system of claim 6, wherein two or more programmable logic devices cooperatively increase the wire data packet transmission rate of the system.

9. The system of claim 1, wherein the programmable logic device further comprises an MPEG-2 stitching engine for targeted ad insertion.

10. The system of claim 1, wherein the programmable logic device is further adapted to encrypt the wire data packet.

11. A method for assembling digital media asset data into wire data packets, said method comprising:
storing a control block in a media buffer, the control block comprising:
a first plurality of control block entries,
a second plurality of control block entries, and
control information,
wherein individual entries of the first plurality of control block entries comprise a pointer to a first subset of media packet payload data, and
wherein individual entries of the second plurality of control block entries comprise a second subset of media packet payload data;
assembling a wire data packet from said digital media asset data by a programmable logic device according to said control information, wherein said assembling comprises:
generating, by a header formatter state machine, a first header associated with a first protocol according to said control information,
generating, by said header formatter state machine, a second header associated with a second protocol according to said control information,
generating, by a parser state machine, a media packet payload by:
determining an address in said media buffer for the first subset of media packet payload data referenced by ones of the first plurality of control block entries,
determining the second subset of media packet payload data contained in ones of the second plurality of control block entries, and
concatenating the first subset of media packet payload data referenced by the pointer in the ones of the first plurality of control block entries and the second subset of media packet payload data contained in the ones of the second plurality of control block entries according to the control information, and
multiplexing, by a packet assembler state machine, said first header, said second header, and said media packet payload, and assembling said wire data packet comprising said multiplexed first header, second header, and media packet payload.

12. The method of claim 11, wherein said control information comprises packet header formatting instructions and digital media asset payload information.

13. The method of claim 11, wherein a media buffer data reception rate is greater than or equal to a programmable logic device data reception rate.

14. The method of claim 11, wherein said first protocol is User Datagram Protocol (UDP) and said second protocol is Internet Protocol (IP).

15. The method of claim 11, wherein the programmable logic device is a field programmable gate array.

16. The method of claim 11, further comprising transmitting, by a network interface, said wire data packet at a wire data packet transmission rate, wherein said programmable logic device is further configured to generate a plurality of wire data packets at a wire data packet generation rate greater than or equal to the wire data packet transmission rate.

17. The method of claim 16, wherein a programmable logic device data reception rate is greater than or equal to said wire data packet generation rate.

18. The method of claim 16, wherein two or more programmable logic devices cooperatively increase the wire data packet transmission rate.

19. The method of claim 11, further comprising inserting a targeted ad in the wire date packet.

20. The method of claim 11, further comprising encrypting said wire data packet.

21. A system for assembling digital media asset data into wire data packets, said system comprising:
means for storing a control block in a media buffer, said control block comprising:
a first plurality of control block entries,
a second plurality of control block entries, and
control information,
wherein individual entries of the first plurality of control block entries comprise a pointer to a first subset of media packet payload data, and
wherein individual entries of the second plurality of control block entries comprise a second subset of media packet payload data;
means for reading, by a programmable logic device said control block, said programmable logic device comprising:
means for generating, by a header formatter state machine, a first header associated with a first protocol according to said control information,
means for generating, by said header formatter state machine, a second header associated with a second protocol according to said control information,
means for generating, by a parser state machine, a media packet payload by:

determining an address in said media buffer for the first subset of media packet payload data referenced by the pointer in ones of the first plurality of control block entries, determining the second subset of media packet payload data contained in ones of the second plurality of control block entries, and concatenating the first subset of media packet payload data referenced by the pointer in the ones of the first plurality of control block entries and the second subset of media packet payload data contained in the ones of the second plurality of control block entries according to the control information, and means for multiplexing, by a packet assembler state machine, said first header, said second header, and said media packet payload, and generating said wire data packet comprising said multiplexed first header, second header, and media packet payload.

22. The system of claim 21, wherein said control information comprises packet header formatting instructions and digital media asset payload information.

23. The system of claim 21, wherein a media buffer data reception rate is greater than or equal to a programmable logic device data reception rate.

24. The system of claim 21, wherein said first protocol is User Datagram Protocol (UDP) and said second protocol is Internet Protocol (IP).

25. The system of claim 21, wherein the programmable logic device is a field programmable gate array.

26. The system of claim 21 further comprising means for transmitting, by a network interface, said wire data packet at a wire data packet transmission rate, wherein said programmable logic device is further configured to generate a plurality of wire data packets at a wire data packet generation rate greater than or equal to the wire data packet transmission rate.

27. The system of claim 26, wherein a programmable logic device data reception rate is greater than or equal to the wire data packet generation rate.

28. The system of claim 26, wherein two or more programmable logic devices cooperatively increase the wire data packet transmission rate.

29. The system of claim 21, further comprising means for inserting a targeted ad in said wire date packet.

30. The system of claim 21, further comprising means for encrypting said wire data packet.

* * * * *

UNITED STATES PATENT AND TRADEMARK OFFICE
CERTIFICATE OF CORRECTION

PATENT NO. : 7,899,924 B2
APPLICATION NO. : 10/369306
DATED : March 1, 2011
INVENTOR(S) : Oesterreicher et al.

It is certified that error appears in the above-identified patent and that said Letters Patent is hereby corrected as shown below:

Title Page 2, item (56), under "Other Publications", in Column 2, Line 9, delete "MCS4,MPEG2" and insert -- MCS4-MPEG2 --.

Title Page 3, item (56), under "Other Publications", in Column 1, Line 38, delete "http://1www.broadbandweek.com" and insert -- http://www.broadbandweek.com --.

Column 12, line 41, in Claim 19, delete "date" and insert -- data --.

Column 14, line 6, in Claim 26, delete "claim 21" and insert -- claim 21, --.

Column 14, line 19, in Claim 29, delete "date" and insert -- data --.

Signed and Sealed this
Twenty-eighth Day of June, 2011

David J. Kappos
*Director of the United States Patent and Trademark Office*